United States Patent
Riza

(10) Patent No.: US 7,978,346 B1
(45) Date of Patent: Jul. 12, 2011

(54) METHODS AND SYSTEMS FOR REALIZING HIGH RESOLUTION THREE-DIMENSIONAL OPTICAL IMAGING

(75) Inventor: Nabeel A. Riza, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 12/706,277

(22) Filed: Feb. 16, 2010

Related U.S. Application Data

(60) Provisional application No. 61/153,444, filed on Feb. 18, 2009.

(51) Int. Cl.
*G01B 11/22* (2006.01)

(52) U.S. Cl. .......................... 356/627; 356/368

(58) Field of Classification Search .......... 356/485–487, 356/495, 511–516, 625, 601–613, 627, 628, 356/364–365, 369; 435/419; 600/425–476; 250/559.19, 559.21
See application file for complete search history.

(56) References Cited

U.S. PATENT DOCUMENTS

| | | | | |
|---|---|---|---|---|
| 4,297,034 A * | 10/1981 | Ito et al. | ..................... | 356/394 |
| 5,321,501 A * | 6/1994 | Swanson et al. | ............... | 356/479 |
| 5,381,236 A * | 1/1995 | Morgan | ......................... | 356/609 |
| 5,541,413 A * | 7/1996 | Pearson et al. | ............ | 250/339.11 |
| 5,889,505 A * | 3/1999 | Toyama et al. | ................ | 345/156 |
| 5,994,690 A * | 11/1999 | Kulkarni et al. | .............. | 250/216 |
| 6,118,908 A * | 9/2000 | Bischel et al. | ................... | 385/14 |
| 6,687,036 B2 | 2/2004 | Riza | | |
| 6,965,431 B2 * | 11/2005 | Vo-Dinh et al. | ............... | 356/301 |
| 7,180,602 B2 | 2/2007 | Riza | | |
| 7,262,839 B2 * | 8/2007 | Treado et al. | .................... | 356/73 |
| 2004/0211903 A1 * | 10/2004 | Bynum et al. | ............. | 250/341.1 |
| 2005/0167578 A1 * | 8/2005 | Riza et al. | ...................... | 250/234 |

OTHER PUBLICATIONS

Y. Yasuno, Birefringence imaging of human skin by polarization-sensitive spectral interferometric optical coherence tomography, Oct. 15, 2002, Optics Letters, vol. 27, No. 20, 1803-1805.*

(Continued)

*Primary Examiner* — Tarifur R Chowdhury
*Assistant Examiner* — Michael LaPage
(74) *Attorney, Agent, or Firm* — Brian S. Steinberger; Phyllis K. Wood; Law Offices of Brian S. Steinberger, P.A.

(57) ABSTRACT

Methods and systems for realizing high resolution three-dimensional (3-D) optical imaging using diffraction limited low resolution optical signals. Using axial shift-based signal processing via computer based computation algorithm, three sets of high resolution optical data are determined along the axial (or light beam propagation) direction using low resolution axial data. The three sets of low resolution data are generated by illuminating the 3-D object under observation along its three independent and orthogonal look directions (i.e., x, y, and z) or by physically rotating the object by 90 degrees and also flipping the object by 90 degrees. The three sets of high resolution axial data is combined using a unique mathematical function to interpolate a 3-D image of the test object that is of much higher resolution than the diffraction limited direct measurement 3-D resolution. Confocal microscopy or optical coherence tomography (OCT) are example methods to obtain the axial scan data sets.

22 Claims, 9 Drawing Sheets

OTHER PUBLICATIONS

Khan, S.A., Riza, N. A., Demonstration of a No-Moving-Parts Axial Scanning Confocal Microscope Using Liquid Crystal Optics, Opt. Comm., 2006, pp. 461-467, vol. 265.

Sheikh, M., Riza, N. A., Blood Vessel 3-D Imaging Using Electronically Controlled Optics Lens-Based Confocal Microscop, OSA Top., OSA Top. Mtg on Biomedical Optics, Technical Digest, 2008, paper No. BTuF64. Abstract.

Riza N. A., Sheikh M., Webb-Wood G.. Kik P. G., "Demonstration of Three-Dimensional Optical Imaging sing a Confocal Microscope Based on a Liquid-Crystal Electronic Lens," Optical Engineering Journal, 2008, pp. 063201-1 to 063201-9 vol. 47, No. 6.

Riza, N. A., Bakker, ., Bokhari, A., "Programmable Spectral Interferometric Microscopy," AIP Rev. Scientific Instru., 2005, pp. 033107-1-0330107-10, vol. 76.

Riza, N. A., Sheikh, "Liquid lens Confocal Microscopy with Advanced Signal Processing for Higher Resolution 3D Imaging," Conference MI03: Physics of Medical Imaging, SPIE Medical Imaging, 2009, pp. 725848-1-725848-13, vol. 7258, paper No. 155.

Riza, N. A., Bokhari A., "Agile Optical Confocal Microscopy Instrument Architectures For High Flexibility Imaging," in Three Dimensional Confocal Microscopies, BIOS 2004 Biomedical Optics, Photonics West, Proc. SPIE, pp. 77-88, vol. 5324, Paper No. 14.

* cited by examiner

METHODS AND SYSTEMS FOR REALIZING HIGH RESOLUTION THREE-DIMENSIONAL OPTICAL IMAGING

This application claims the benefit of priority to U.S. Provisional Patent Application No. 61/153,444 filed on Feb. 18, 2009.

FIELD OF THE INVENTION

This invention relates to signal processing and, in particular, to methods and systems for a multi-function optical microscope using signal processing for realizing high resolution three dimensional optical imaging using diffraction limited low resolution optical signals.

BACKGROUND AND PRIOR ART

There are numerous applications where 3-D imaging of objects is desirable. Applications include the electromagnetic (EM) spectrum to ultrasonic frequencies. Instruments for example include Radio Frequency (RF) radar, optical radar, X-ray imagers, optical microscopes, and ultrasound. In general, the wave properties of the probing signal in combination with the material properties of the test object limits the 3-D resolution of the imager. In classical wave optics (EM radiation), wave diffraction sets a limit on the smallest size the optical imager can see in the transverse direction, this limit called the Abbe limit given by $0.5\lambda/N.A.$, where N.A is the numerical aperture of the aperture times the refractive index n of the medium in which the object is observed.

For a given microscope objective lens, $N.A.=n \sin \theta$, where $\theta$ is the maximum half angle that the lens can capture to pick up the highest spatial frequency in the object. In the axial direction, diffraction also plays its limiting role such as in confocal microscopes where the axial resolution (Full-Width-Half-Max: FWHM) can be typical given by $1.4n\lambda/(N.A.)^2$. For example, with n=1 (air), N.A.=1.3, and red light with $\lambda$=633 nm, the transverse and full-width-half-max axial resolution are 0.24 microns and 0.5 microns, respectively. In alternate Optical Coherence Tomography (OCT) systems, the axial resolution is limited by the coherence length limit of the illuminating radiation, i.e., broader the EM bandwidth, the smaller the axial resolution. In effect, both axial and transverse resolution of optical imagers is on the order of the optical wavelength. It would be highly desirable if optical imagers could see in 3-D with resolution far better than the order of wavelength, perhaps, a 100 or 1000 times smaller than the wavelength. Ultimately, the voxel produced would be a high resolution voxel no longer limited in size by the classic diffraction or coherence limits.

Today, the Abbe resolution still holds strong in optical imagers/microscopes. Various approaches have been tried to improve the axial and transverse resolution of microscopes. One way to get better resolution is via image processing algorithms. Images can get blurred due to fast motion of objects and/or because the image is out of focus because of imperfect imaging conditions. Image sharpening algorithms have been developed that can reduce the image blur or defocus giving higher resolution images. One such successful algorithm involves taking high resolution shifts of low resolution images and then Iterative Back-Projection (IBP) processing to generate the high resolution image. Such an iterative algorithm has been applied to produce higher resolution images such as in remote sensing, and 2-D and 3-D super-resolution on single shot Magnetic Resonance Imaging (MRI). Other image restoration algorithms have also been applied to 3-D optical microscopy to improve imaging resolution. Here, complete 2-D image slices are acquired for different finely tuned focus positions and then this image data is processed. Other successful image processing algorithms applied to high resolution imaging via use of shifted low resolution images include Maximum Likely-Hood Estimation and Iterative Blind Deconvolution.

In these computer based algorithms, one uses the given (by theory) or acquired (by experiment) or estimated Point Spread Function for the imager along-with the high resolution shifted images to reconstruct the high resolution image or 3-D data. As an example, given a low resolution voxel size of X per side, a high resolution shift would be of X/(2N) implemented for both image directions and 2N×2N images are acquired and then processed to finally give a high resolution image with a pixel size of X/N per side. In effect, using these computer algorithms as is done today, massive amount of data processing is required.

Unlike the prior art, the present invention 3-D imaging scheme uses line or one-dimensional (1-D) signal space data along the axial direction to produce the needed high resolution 1-D slices instead of the much larger image or two-dimensional (2-D) signal space data acquired in the transverse direction suffering the Abbe limit.

In addition, prior art shows that breaking the optical limits is not a repudiation of the laws of physics. Nature performs similar interpolation-like brain processing when human vernier acuity tasks are performed to give an order of magnitude better vision than the eye spatial sampling hardware (i.e., cone spacing) allows. Analysis of this phenomenon with broadly tuned sensors yields very high spatial resolutions (error less than $10^{-4}$). This interpolation technique of reconstructing fine detail from coarse input sensors can also be utilized to enhance biological and artificial spectrum analyzers.

Cytology, the study of cells using a microscope can greatly benefit from the present inventions sub-wavelength beyond Abbe diffraction limit 3-D imaging as many biological structures/organelles/molecules have diameters in the nanometers scales, e.g., Golgi vesicles at 50 nm, microtubules (25 nm), antibodies (10-15 nm), nuclear pore (9-12 nm), fluorescent proteins/GFP (4-5 nm), cytochrome c (3 nm), and collagen molecule (1.5 nm). In addition, today nanotechnology is offering great promise in medicine such as via quantum dots, nanoshells, and nano-particles that require nano-scale 3-D optical imaging for tissue targeting, nano-medicine delivery, and tissue diagnostics.

It is well known that optical microscopes are a very versatile tool used in a variety of scientific and engineering disciplines ranging from biomedical imaging to electronic and optical chip inspection. Compared to electron microscopy where special sample preparation is required, optical techniques are particularly non-invasive when live tissue cannot be prepared due to material distortions arising from certain treatments. Today, light microscopy can deliver nano-scale readings using optical interference and signal processing techniques. The visible light spectrum is a dominant spectrum for optical microscopy and applies to numerous materials under inspection, screening, diagnosis, and measurement and hence is the subject of the proposed program.

One very important function of optical microscopes is material birefringence measurements where the material ordinary and extraordinary indices are determined indicating the polarization sensitivity of the material. Birefringence meters are used in applications such as characterization of thin films, laser crystals and plate glass for liquid crystal displays—and general quality control metrology. In addition, the medical imaging community also benefits from birefringence measurements of biological tissue where, for example, healthy liver tissue has been shown to have isotropic structure while unhealthy tissue exhibits anisotropic structures or birefringence. In addition, forms of skin cancer have also shown embedded birefringence.

Today, a custom designed heterodyne polarization microscope produces the most accurate (e.g., ±0.008 nm retardation repeatability) birefringence data, such as by the Exicor meter by Hinds Instruments. The Exicor/Hinds Model AT birefringence meter offers the best performance in optical retardation measurements. The basic system uses a 50 KHz Photo-Elastic Modulator (PEM) in combination with polarizer and analyzer optics to produce the optical phase and amplitude data for test material birefringence calculation as described in B. Wang, T. Oakberg, "A New Instrument for Measuring Both the Magnitude and Angle of Low-level Birefringence," Rev. Sci. Instrum., Vol. 70 Issue 10, 3847-3854, October 1999. The strength of this system comes from its in-line interferometric design coupled with heterodyne optical detection at an RF of 50 KHz leading to low 1/f (f: frequency) noise in the detection electronics. At the red 633 nm wavelength, it measures retardation over a range between 0.005 nm to 100 nm. The standard model is designed to measure birefringence at one wavelength. With an option, the same instrument can be upgraded to measure retardation and three distinct wavelengths of 436 nm, 546 nm, 633 nm, thus provide some spectral information about the sample under test. The instrument cannot function as a profilometer, a 3-D imaging confocal microscope, or a wide spectral range tunable instrument.

A second important function of microscopes is profilometry where surface deformations is optically measured to implement Non-Destructive Testing (NDT) in electronic semiconductor processing, optical chip fabrication, MEMS device inspection, photovoltaic solar panels assembly, liquid crystal display production, and data storage systems. These best profilometry systems such as from Zygo Corp. use Scanning White Light Interferometry (SWLI) with profile resolutions less than 1 nm and range of 0.15 mm for an optimized model.

The present invention pursues a multi-function instrument that realizes a profilometer with equivalent or better performance of a Zygo scanning white light interferometry system. Profilometry using optics has deployed various methods such as chromatic aberration lens based profile coding and the most dominant approach, white light interferometry [see Leslie Deck and Peter de Groot, "High-speed noncontact profiler based on scanning white-light interferometry," Appl. Opt. 33, 7334-7338 (1994) and Peter De Groot, Xavier Colonna de Lega, Jan Liesener, and Michael Darwin, "Metrology of optically-unresolved features using interferometric surface profiling and RCWA modeling," Opt. Express 16, 3970-3975 (2008)].

Today, two of the most advanced profilometers are from Zygo Corporation. One profilometer uses Phase Shift Interferometry (PSI) with near 1 nm height resolution over a 138 nm height while and another uses scanning white light interferometry system with a typical range of 0.15 mm and 20 mm for an advanced version. Motion of the test sample or interferometer head in the axial direction is used to record white light interferograms that are processed by image processing algorithms to produce the profile map. The problem is, the dominant scanning white light interferometry system profilometer is not designed for microscope confocal imaging or birefringence measurements or agile spectroscopy.

A third important function of microscopes is confocal microscopy where three dimensional optical imaging of a test sample is realized. A dominant application of confocal microscopy, more specifically, Laser Scanning Confocal Microscopy (LSCM) is biological imaging. A particular application for laser scanning confocal microscopy is implementing fluorescence-based imaging and here the confocal method has shown repeatable results with 200 nm lateral resolution and 500 nm axial resolutions. Hence, the laser scanning confocal microscopy is considered a vital tool in neurobiology, physiology, development biology, and cell and molecular biology. Typical diameter dimensions of biological specimens such as animal cells range between 10-30 micron, cell nucleus range between 3-10 micron, lyosomes between 200-500 nm, hemoglobins around 30 nm, and Collagen molecule around 1.5 nm.

Carl Zeiss Model LSM 710 sets the performance standards for a laser scanning confocal microscopy. Over the years, Carl Zeiss is internationally recognized as a leader in laser scanning confocal microscopy via for example the Zeiss Model 710 laser scanning confocal microscopy. The key points to note here is that axial direction scanning is done by a mechanical motion of either the objective or the sample stage using piezo-actuators with typically 30 nm resolution. Because biological imaging, in particular, in-vivo or live samples can be perturbed by the slightest motion of sample or fluid (i.e., index matching fluid) associated with a high NA: Numerical Aperture objective, ideally one would like to avoid any sample-coupled motion. For example, this mechanical motion based effect can be pronounced in applications such as imaging of non-adherent cells in free floating media and high magnification patch clamp work in neuroscience. Presently, the Zeiss instrument cannot avoid this design limitation associated with sample/objective motion. Also note that the exact laser scanning confocal microscopy performance depends on the specific high N.A. objective used, the laser wavelength, the scan mechanics and its scan steps and modes. A typical performance for visible light laser scanning confocal microscopy is 200 nm lateral resolution, 500 nm axial resolution, and less than 1 second acquisition time per 512× 512 pixels image. Again, the dominant laser scanning confocal microscopy is not designed for birefringence measurements and extended range of greater than 500 micron profilometery.

A fourth important function of microscopes is spectral microscopy where optical imaging on a wavelength basis of a test sample is realized. Typically, spectral imaging in a laser scanning confocal microscopy is achieved by providing several independent input ports to the system, as is done in the Carl Zeiss Model LSM 710 with separate fiber port inputs. These laser scanning confocal microscopy devices provide excellent spectral and confocal imaging modalities, but are not designed to enable birefringence measurements or extended depths greater than 500 micron profilometry data.

To overcome the problems associated with the prior art, what is needed is methods, systems and instruments that pursue a multi-function instrument that realizes a laser scanning confocal microscopy and spectral imager with better or equivalent performance of a Carl Zeiss SWLI model 710 type system. Furthermore, the spectral imager will need to have the potential to implement broadband light optical coherence tomography (OCT) via a Radio Frequency (RF) domain Fourier Transform (FT) mode.

Recently, there have been efforts to turn single wavelength laser scanning confocal microscopes into spectral microscopes using a broadband white light source and wavelength tuning and/or wavelength sensitive optical detection, e.g., via grating spectrometer such as described in C. Dunsby et al., "An electronically tunable ultrafast laser source applied to fluorescence imaging and fluorescence lifetime imaging microscopy," J. Phys. D Appl. Phys., 37, 3296-3303 (2004); T. Betz, et al., "Excitation beyond the monochromatic laser limit: simultaneous 3-D confocal and multiphoton microscopy with a tapered fiber as white-light laser source," J. Biomed. Opt. 10, 054009 (2005); G. McConnell, S. Poland, and J. M. Girkin, "Fast wavelength multiplexing of a white-light supercontinuum using a digital micromirror device for improved three-dimensional fluorescence microscopy," Rev. Sci. Instrum. 77, 013702 (2006); J. H. Frank, A. D. Elder, J. Swartling, A. R. Venkitaraman, A. D. Jeyasekharan, and C. F. Kaminski, "A white light confocal microscope for spectrally resolved multidimensional imaging" J. Micros. Oxford 227, pp. 203-215 (2007).

Most laser scanning confocal microscopy devices including the high end Carl Zeiss model 710 can function as a spectral microscope since the microscope has several input laser line ports or as the Model 710 design shows, a broadband visible source is coupled to a single acousto-optic tunable filter (AOTF) device to select the wavelength. Again, note that Zeiss spectral microscope is not designed for birefringence measurements and extended range greater than 500 micron profilometery. In addition, at present, these laser scanning confocal microscopy designs cannot implement broadband light optical coherence tomography.

SUMMARY OF THE INVENTION

A primary objective of the invention is to provide methods and systems for an all-in-one multi-function optical microscope that can realize material birefringence measurements, profilometry, confocal microscopy, optical coherence tomography, Fourier transform optical coherence tomography, spectroscopy, and spectral imaging.

A secondary objective of the invention is to provide methods and systems for signal processing for realizing high resolution three-dimensional (3-D) optical imaging using diffraction limited low resolution optical signals.

A third objective of the invention is to provide methods and systems for a multi-function optical microscope that can engage the proposed high resolution signal processing to realize very high resolution sample 3-D views.

A fourth objective of the invention is to provide methods and systems for a reduced aberrations multi-liquid lens confocal microscope.

A fifth objective of the invention is to provide methods and systems for applying the signal processing to any 3-D wave-based 3-D imager including imagers using electromagnetic waves and sound (ultrasonic) waves.

A sixth objective of the invention is to provide methods and systems for an instrument that can be programmed to accurately measure localized material birefringence of a sample at a chosen wavelength across a band of wavelengths.

A seventh objective of the invention is to provide methods and systems for an instrument that can be used for simultaneous spectral and birefringence-based imaging using confocal microscopy via the use of fiber-optics.

An eighth objective of the invention is to provide methods and systems for an instrument that can take data on a per wavelength basis across a specified band. In effect, it becomes a spectroscopy tool including for spectral imaging. This per wavelength magnitude and phase RF data collected from the optical test sample can also be Fourier transformed electronically to implement Fourier domain optical coherence tomography. Nevertheless, note that this single acousto-optic tunable filter system cannot remove the out-of-band wavelengths from the reference beam and as such can lead to interference effects and reduced detection dynamic range.

A first preferred embodiment of the invention provides a method for three-dimensional optical imaging including aligning an optical scanning source in one of the three different independent and orthogonal directions for each one of three different independent and orthogonal directions, axial scanning a three-dimensional object under evaluation on a point-by-point basis, detecting reflected optical energy from the three dimensional object to collect plural one-dimensional axial scan data sets of the three-dimensional object area of interest, axial shifting by mechanical motion of either a focus of the scanning optical beam or the object under evaluation in an axial direction only. The scanning and axial shifting is repeated until the three-dimensional object area of interest has been scanned for each of the three different independent and orthogonal look directions, then each set of one-dimensional plural axial scan data sets is organized and processed by a computer executing a computer algorithm to convert the three directional volume pixel data sets to a three-dimensional reconstructed image. Optionally, opacity transformation is applied on the a three-dimensional reconstructed image to expose interior details of the area of interest.

The scanning step includes scanning the three dimensional object area of interest independently in each of a x-direction, y-direction and z-direction direction by first illuminating the three-dimensional object under observation along an x-direction, y-direction and z-direction, obtaining plural x-direction axial scan data subsets along the x-axial direction, each data subset corresponding to a x-direction axial shift, obtaining plural y-direction axial scan data sets along the y-axial direction, each axial scan data set corresponding to a y-direction axial shift and obtaining plural z-direction axial scan data sets along the z-axial direction, each data set corresponding to a z-direction axial shift.

The axial scanning can be accomplished using one of a broadband optical source and a tunable laser with a dispersive lens to accomplish the axial scanning. The processing step includes processing the plural one-dimensional axial scan data sets for each of the three different independent and orthogonal axial directions to generate corresponding high resolution axial slice data sets along each of the three independent and orthogonal axial look directions using the Point Spread Function of the imager and interpolating the three sets of axial slice data for each of the three axial look directions to reconstruct a 3-dimensional image of the object under evaluation. The organizing and processing step uses a computer algorithm selected from a group consisting of Iterative Back Projection, Iterative Blind Deconvolution, and Maximum Likely-Hood Estimation.

A second preferred embodiment provides a multi-function optical instrument to implement profilometry, confocal microscopy, birefringence measurements, and spectral microscopy including Fourier domain optical coherence tomography. The instrument includes a wavelength tunable optical source to produce an input optical beam, an electronically controlled imaging system coupled with the tunable optical source to produce and transmit two orthogonally polarized optical scanning beams and reception of reflected optical beams, an axial scanning system coupled with the imaging system for axial shifting by mechanical motion in an axial direction only of either a focus of the optical scanning beam and the object under evaluation, a detection system to detect reflected optical beams and generate dual RF signals to be processed by a phase-locked amplifier to produce the magnitude and optical phase of the optical wavelength signal targeted on the object under evaluation, and a computer system including a processor and memory for storing and for processing the magnitude and optical phase of the optical wavelength signal of the object under evaluation to reconstruct a high resolution image of the object under evaluation.

A third preferred embodiment provides a liquid lens confocal microscope system that includes a light source for generating an input collimated beam, an axial scanning liquid lens driven by a variable voltage source to axially scan an object by varying the axial scanning liquid lens drive voltage, a microscope objective optically between the axial scanning liquid lens and an object under evaluation, two or more E lenses optically aligned between the light source and the axial scanning liquid lens to compensate for aberrations, each of the two or more liquid lenses driven by an independent drive signal, and a beam splitter to direct the input collimated beam toward the axial scanning liquid lens and reflecting a return optical beam from the axial scanning liquid lens to a receiver spherical lens and serial photo detector to produce an output signal in response to detecting a return optical signal from the beam splitter.

Further objects and advantages of this invention will be apparent from the following detailed description of preferred embodiments which are illustrated schematically in the accompanying drawings.

DESCRIPTION OF THE PREFERRED EMBODIMENTS

Figure 1:
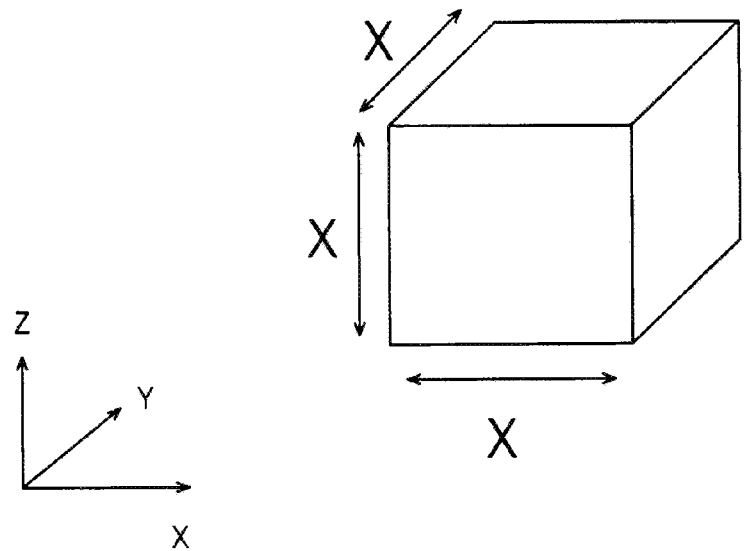
FIG. 1 is a perspective view of a low resolution voxel obtained via traditional prior art 3-D imaging methods.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Earlier methods and systems proposed agile confocal microscopy for profilometry and 3-D imaging. The methods, systems and instruments of the present inventions key concept for agile confocal microscopy is to deploy electronically controlled 3-dimensional beam forming optics to steer a light beam in a confocal microscope as described in U.S. Pat. No. 6,687,036 issued Feb. 3, 2004 issued to N. A. Riza a co-inventor of the present invention and assigned to the same assignee which is incorporated herein by reference titled Multiplexed Optical Scanner Technology" and described by the inventor in N. A. Riza and A. Bokhari, "Agile Optical Confocal Microscopy Instrument Architectures For High Flexibility Imaging," in Three Dimensional Confocal Microscopies, BIOS 2004 Biomedical Optics, Photonics West, Proc. SPIE Vol. 5324, Paper No. 14, pp. 77-88, San Jose, Calif., January 2004.

A nematic liquid crystal (NLC) Electronic Lens (E-lens) can be used to enable a no-moving parts z-scan confocal microscope for profilometry of an optical integrated waveguide device like the Indium Phosphide device as described by the inventor in S. A. Khan and N. A. Riza, "Demonstration of a No-Moving-Parts Axial Scanning Confocal Microscope Using Liquid Crystal Optics," Opt. Comm., Vol. 265, pp. 461-467, 2006.

Some preliminary 3-dimensional (3-D) optical imaging experiments of a blood vessel using the E-lens agile confocal microscope of the present invention have also been conducted as described in M. Sheikh and N. A. Riza, "Blood Vessel 3-D Imaging Using Electronically Controlled Optics Lens-Based Confocal Microscopy," OSA Top. Mtg on Biomedical Optics, Technical Digest, paper no. BTuF64, March 2008; N. A. Riza, M. Sheikh, G. Webb-Wood, and P. G. Kik, "Demonstration of three-dimensional optical imaging using a confocal microscope based on a liquid-crystal electronic lens," Optical Engineering Journal, Vol. 47, No. 6, pp. 063201-1 to 063201-9, June 2008 and in Jul. 15, 2008 issue of Virtual Journal of Biological Physics Research.

The present invention demonstrates a spectrally agile heterodyne optical interferometric confocal microscopy instrument that has been successfully tested in the 1500-1600 nm band to measure birefringence of nematic liquid crystal birefringment media with approximately 0.5 degree RF phase stability of less than approximately 1 nm retardation as described in N. A. Riza, M. Bakker, A. Bokhari, "Programmable Spectral Interferometric Microscopy," AIP Rev. Scientific Instru., Vol. 76, 033107, 1 March on-line date, 2005 and U.S. Pat. No. 7,180,602 issued Feb. 20, 2007 to N. A. Riza, F. Perez, A. Bokhari titled Agile spectral interferometric microscopy.

The fiber forms the confocal pin-hole while the tunable laser forms the broadband time multiplexed source. The acousto-optic tunable filter arrangement is key aspect of this design because it naturally produces two orthogonally polarized (p and s) beams that have a relative RF Doppler shift that leads to heterodyne detected low 1/f high sensitivity signal with appropriate sample optical phase and attenuation information for subsequent signal processing. Data from the sample is acquired on a point-by-point basis using sample scanning.

The instruments of the present invention can be programmed to accurately measure localized material birefringence of a sample at a chosen wavelength across a band of wavelengths. In effect, the methods, systems and instruments can be used for simultaneous spectral and birefringence-based imaging using confocal microscopy via the use of fiber-optics. It is also important to note that the instrument can take data on a per wavelength basis across a specified band. In effect, it becomes a spectroscopy tool including use for spectral imaging. This per wavelength magnitude and phase RF data collected from the optical test sample can also be Fourier transformed electronically to implement Fourier domain optical coherence tomography. However, the single acousto-optic tunable filter system cannot remove the out-of-band wavelengths from the reference beam and as such can lead to interference effects and reduced detection dynamic range.

Voxel is short for volume pixel, the smallest distinguishable box-shaped part of a three-dimensional image and Voxelization is the process of adding depth to an image using a set of cross-sectional images known as a volumetric dataset. These cross-sectional images, or slices, are made up of pixels, the space between any two pixels in one slice is referred to as interpixel distance, which represents a real-world distance and, the distance between any two slices is referred to as interslice distance, which represents a real-world depth.

The dataset is processed when slices are stacked in computer memory based on interpixel and interslice distances to accurately reflect the real-world sampled volume. Next, additional slices are created and inserted between the dataset's actual slices so that the entire volume is represented as one solid block of data. Now that the dataset exists as a solid block of data, the pixels in each slice have taken on volume and are now voxels.

For a true 3-dimensional image, voxels must undergo opacity transformation. Opacity transformation gives voxels different opacity values which is important when it is crucial to expose interior details of an image that would otherwise be hidden by darker more opaque outside-layer voxels. Voxel images are primarily used in the field of medicine and are applied to X-Rays, CAT (Computed Axial Tomography) Scans, and MRIs (Magnetic Resonance Imaging) so professionals can obtain accurate three-dimensional models of the human body.

The method, system and instruments of the present invention provides an alternate signal processing method (also see N. A. Riza and M. Sheikh, "Liquid lens confocal microscopy with advanced signal processing for higher resolution 3D imaging," Conference M103: Physics of Medical Imaging, SPIE Medical Imaging, Vol. 7258, paper No. 155, Lake Buena Vista, Fla., Feb. 11, 2009) for realizing high resolution three-dimensional optical imaging using diffraction limited low resolution optical signals. Three sets of high resolution optical data are determined along the axial (or light beam propagation) direction. The three sets are generated by illuminating the 3-D object under observation along its three independent and orthogonal look directions (i.e., x, y, and z). Alternately, the object can be physically rotated by 90 degrees and also flipped by 90 degrees to get the required three sets of data that is diffraction limited in the transverse spatial direction but high resolution in the axial direction.

Because the axial resolution is also limited by optical diffraction or temporal coherence effects, the directly measured axial resolution is also limited to a low spatial resolution signal. By taking many low resolution axial data, each for a small high resolution axial shift of the object under illumination (or shift of the optical beam axial minimum), a high resolution optical data signal for the axial direction of the object can be obtained after computer-based signal processing. The three sets of high resolution axial data (each low resolution in its given transverse direction) can then be combined using a special mathematical function to interpolate a 3-D image of the test object that is of much higher resolution than the diffraction limited direct measurement 3-D resolution. Confocal microscopy or optical coherence tomography (OCT) are example methods to obtain the axial scan data sets. The present invention processing can be applied to any 3-D wave-based 3-D imager including ones using electromagnetic waves and ultrasonic sound waves.

In addition, the methods, systems and instruments of the present invention provide a multi-function optical microscope design using an interconnection of a host of device technologies including acousto-optics, liquid crystals, fluidics, photonic crystals, optical Micro-Electro-Mechanical Systems (MEMS), bulk polarization optics, high speed photo-diodes and Radio Frequency (RF) electronics. Each device technology performs a particular processing operation on the light within the optical instrument that is vital to its multi-function mission. The core of the optical design is a self-aligning near in-line super phase stability optical interferometric structure that simultaneously allows orthogonal polarization multiplexing, rapid wavelength selection, RF heterodyne detection, and fast interferometric or non-interferometry microscope mode selection. The microscope according to the present invention uses a near-in-line beam geometry design that includes using an electronically controlled liquid lens to enable axial scanning for profilometry and 3-D confocal imaging.

Figure 2:
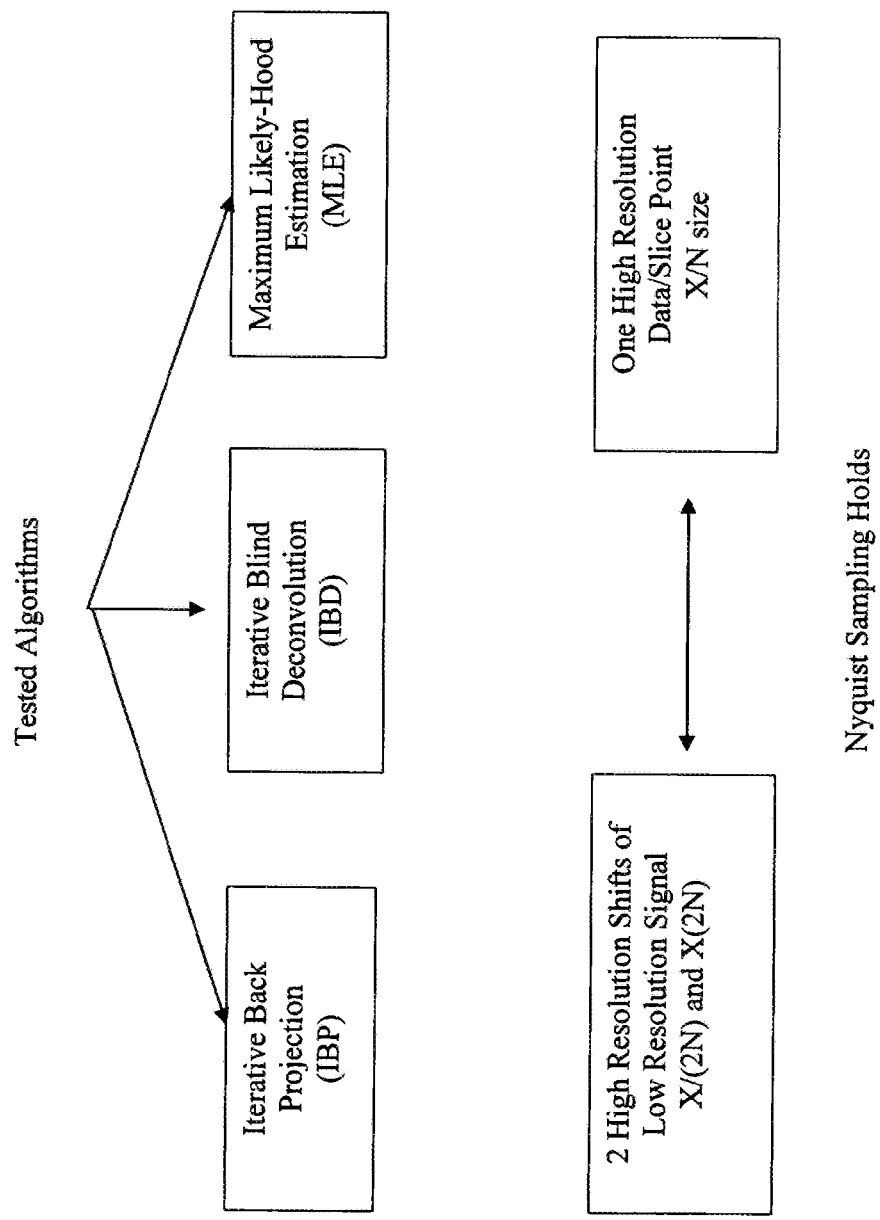
FIG. 2 is a flow diagram showing an example of computer algorithm options to use shifted low resolution signals to produce the high resolution signal.

FIG. 1 through FIG. 5 show embodiments of the 3-D signal processing of the present invention to realize super resolution 3-D imaging. These steps include formatting the coordinates and size of the low resolution voxel as shown in FIG. 1, use of a known computer algorithm as shown in FIG. 2 and new mathematical processing steps (e.g., Eqn.1), optical data collection steps illustrated in FIGS. 3$a$, 3$b$, and 3$c$, data organization steps shown in FIG. 4 through FIG. 6, and data physical acquisition tools shown in FIG. 7.

The present invention implements 3-D imaging with higher resolution than possible with direct diffraction (and coherence) limited 3-D imaging. For example, in the case of a confocal microscope that is an excellent diffraction limited 3-D imager, the smallest size of an imaged volume element (also called voxel) is on the order of the electromagnetic EM-wave wavelength. For simplicity, one can assume a Cartesian x, y, z coordinate system and the smallest size of the diffraction-limited symmetric voxel to be X by X by X microns as shown in FIG. 1. Of course, in a practical scenario, all sides of the voxel may not exactly be the same. In fact, in confocal microscopy the optical instrument can be designed such that the axial resolution (along optical beam direction) is two times smaller than the transverse diffraction limited (Abbe) resolution (e.g., via a 4-Pi Confocal Microscope). In effect, one can get sub-wavelength resolution with an optical confocal microscope, but not several orders of magnitude direct improvement in resolution over diffraction limits.

The steps for implementing the proposed high resolution 3-D processing are as follows in conjunction with FIGS. 1-7. Given the low resolution voxel of sides X shown in FIG. 1, first 1-D high resolution optical data is acquired along the three axial look directions of the voxel. For each axial look direction, the 1-D high resolution optical data is produced by using a known computer processing algorithm. FIG. 2 shows an example of computer algorithm options to use low resolution signals to produce the high resolution signal. The algorithms shown come from the field of image processing and, later, from optical microscopy. The tested algorithms include Iterative Back Projection (IBP); Iterative Blind Deconvolution (IBD); and Maximum Likely-Hood Estimation (MLE).

The basic function is to use the unknown or estimated Point Spread Function of the imaging instrument (PSF) in the transverse and axial directions along with high resolution X/(2N) distance shifts of low resolution image data to generate high resolution X/N voxel size 3-D data using computer processing algorithm. In effect, for each axial look direction, the voxel is shifted as shown in FIGS. 3a, 3b, and 3c in its axial direction by a given high resolution amount (e.g., X/2N) and 2N values of optical data are taken.

Figure 3A:
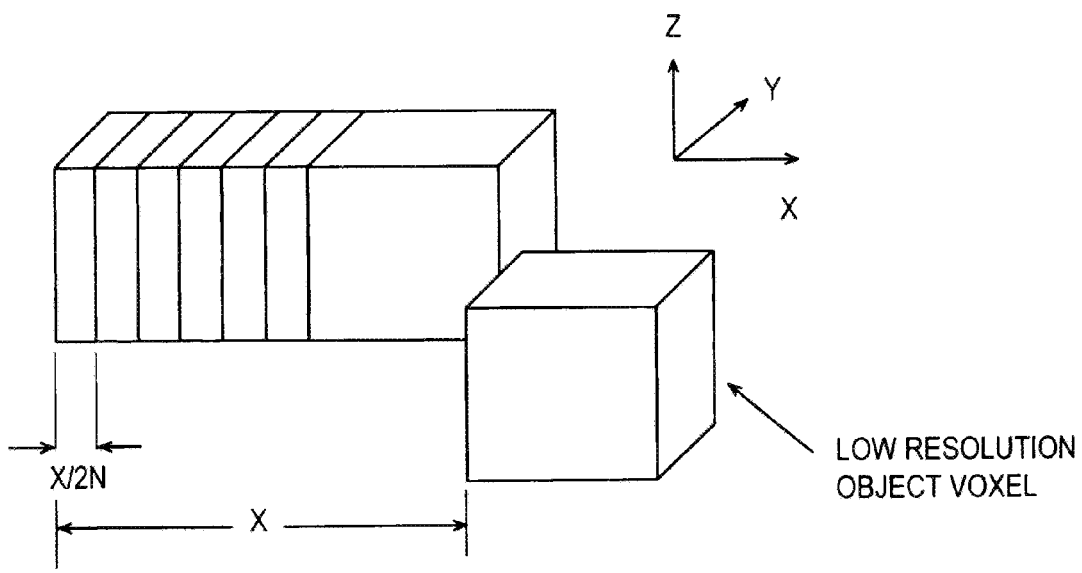
FIG. 3a shows the high resolution motion of the low resolution voxel in the x axial direction.
Figure 3B:
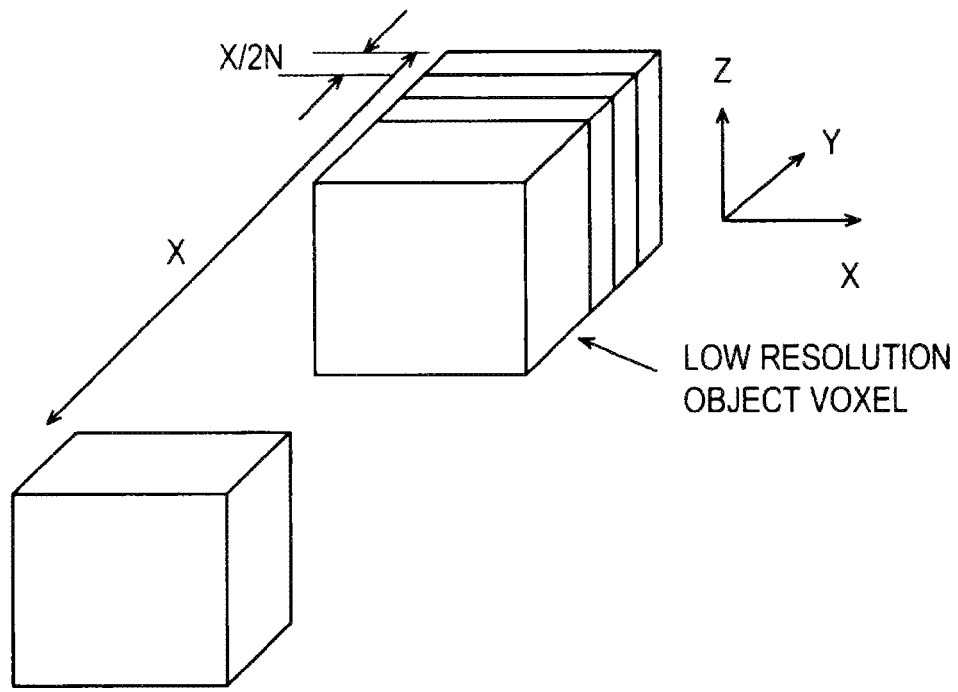
FIG. 3b shows the high resolution motion of the low resolution voxel in the y axial direction.
Figure 3C:
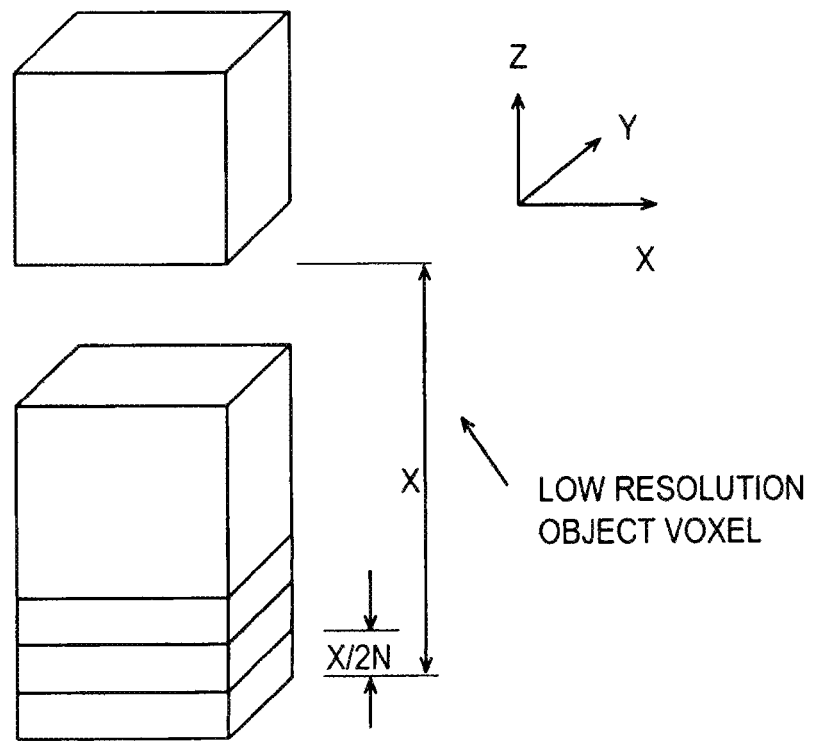
FIG. 3c shows the high resolution motion of the low resolution voxel in the z axial direction.

FIG. 3a shows the low resolution object voxel under-going high resolution shifting in the x-direction while FIG. 3b shows the low resolution object voxel under-going high resolution shifting in the y-direction and FIG. 3c shows the low resolution object voxel under-going high resolution shifting in the z-direction. FIGS. 3a, 3b and 3c, respectively, show 2N independent axial shifts implemented by moving the object or the focus position in the x-direction, y-direction and z-direction.

The measured optical data is used in the computer algorithm to generate high resolution N-slice axial data along the x-direction, y-direction and z-directions, respectively. Referring to FIG. 3a which shows the shifting object, light incident normal to the yz plane and along axial slicing X direction, voxel yz local is not changed during shifting. Similarly, light incident normal to the xz plane and xy planes and along the axial slicing y-direction and z-direction, the voxels xy location and xy location, respectively, is not changed during the shifting.

Figure 7:
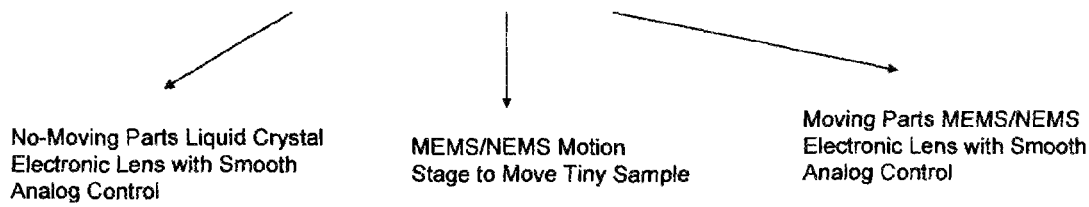
FIG. 7 shows an example of data physical acquisition tools.

FIG. 7 shows an example of data physical acquisition tools that can be used in implementing the present invention. No shift is implemented in the transverse direction of the voxel. This X/(2N) axial high resolution shift can be obtained by either moving the voxel (object under evaluation) using high resolution mechanics including but not limited to Nano or Micro-mechanics; NEMS or MEMS stages or by moving the focus position in the confocal microscope by a variable focal length electronic or mechanical/deformable weak lens made possible using, for example, liquid crystals, deformable mirrors, MEMS, NEMS, fluids, oils, electro-wetting techniques, and Other suitable devices as shown in FIG. 7. For example, in optical coherence tomography, a change in the axial location of the reference mirror.

For example, if X=1 micron, then with 2N=1000 steps, the axial motion step required is 1 nm. Such precision motion is possible with today's high resolution mechanics plus programmable liquid crystal or other non-moving part lenses as described in N. A. Riza and A. Bokhari, "Agile Optical Confocal Microscopy Instrument Architectures For High Flexibility Imaging," in Three Dimensional Confocal Microscopies, BIOS 2004 Biomedical Optics, Photonics West, Proc. SPIE Vol. 5324, Paper No. 14, January 2004, San Jose, Calif., USA; N. A. Riza and Sajjad A. Khan, " Polarization multiplexed optical scanner," Optics Letters, Vol. 28, No. 7, pp. 561-163, Apr. 1, 2003; and S. A. Khan and Nabeel A. Riza, "Demonstration of a No-Moving-Parts Axial Scanning Confocal Microscope Using Liquid Crystal Optics," Optics Communications, 2006).

Another known approach for axial scanning is using a broadband optical source or a tunable laser with a dispersive lens. In this example, each wavelength can be designed to represent a standard of classic axial low resolution slice. One new option of the present invention is to use fine tuning of the source or detection filtering to select finer wavelengths between each axial resolution window to be able to move the axial focus of the confocal focus position on a nanometer or even Angstrom scale. This process, because it is analog, can lead to extremely fine high resolution axial shifts as required for the data processing according to the present invention.

Figure 4A:
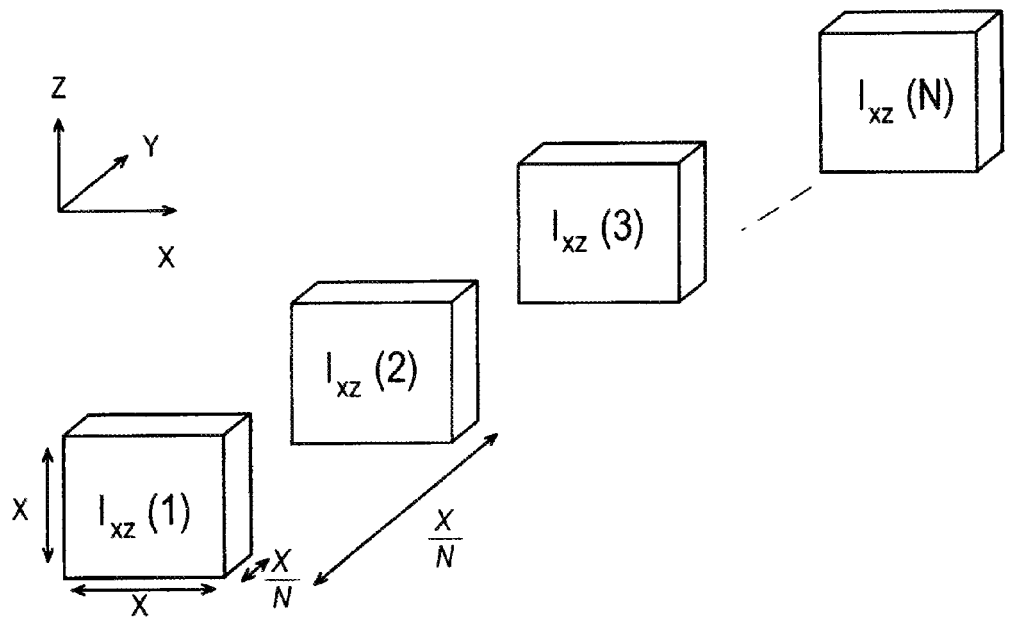
FIG. 4a shows a high resolution 1-D optical irradiance data along Y-axial direction generated via computer algorithm using high resolution Y-direction axial shifts of low resolution voxel.
Figure 4B:
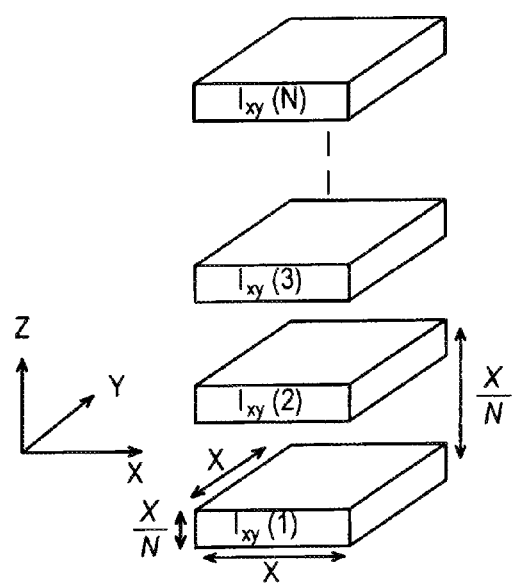
FIG. 4b shows a high resolution 1-D optical irradiance data along z-axial direction generated via computer algorithm using high resolution z-direction axial shifts of low resolution voxel.
Figure 4C:
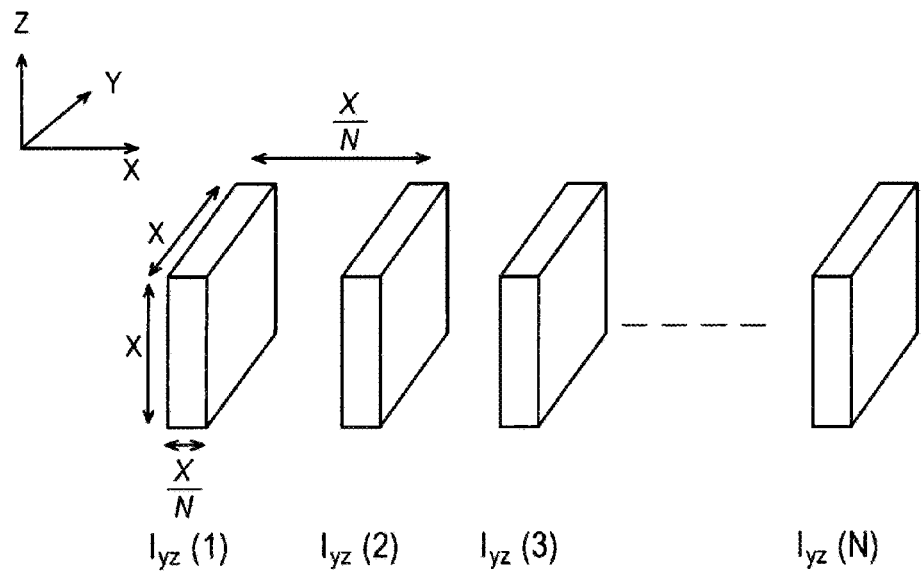
FIG. 4c shows a high resolution 1-D optical irradiance data along x-Axial direction generated computer algorithm using high resolution x-direction axial shifts of low resolution voxel.

FIGS. 4a, 4b and 4c respectively show a high resolution 1-dimensional N-slice optical irradiance data along the y-axial, z-axial and x-axial direction as generated via a computer algorithm using high resolution y-direction 2N axial shifts, z-direction 2N axial shifts, and x-direction 2N axial shifts, respectively, of low resolution voxels. FIG. 4a shows light incident to the xz plane and along the axial slicing y-direction, FIG. 4b shows light incident to the xy plane and along the axial slicing z-direction, and FIG. 4c shows light incident to the yz plane and along the axial slicing x-direction. Using the acquired 2N high resolution axial shift data values for a given axial direction, the computer algorithm (e.g., IBP or MLE or IBD) is applied to obtain the N high resolution axial slice data (each having a size of X/N) for the given look direction as shown in FIGS. 4a, 4b and 4c.

The computer algorithms require the use of the Point Spread Function (PSF) of the imager. The PSF can be measured experimentally, theoretically utilized from known classic expressions, or estimated via computer calculations. In this example, because of the proposed axial sectioning (not transverse direction shifting) for data collection, the PSF can be well estimated in most cases by the classic [Sine function] function axial response (intensity distribution along the optical axis) of the confocal microscope that can also be optimized to be better than the transverse resolution response of the microscope. FIGS. 3a, b, and c show the high resolution motion of the low resolution voxel in the x, y, and z axial directions, respectively. The figures also show shifted voxel in the non-axial directions, but this is only for clarity of diagrams. In practice, only axial motion of voxel is implemented to gather the optical irradiance data off the low resolution voxel element keeping the voxel stationary in the transverse optical coordinates.

For the y axial look direction, after computer-based algorithm processing the process gets N optical data values representing the voxel transverse (xz) irradiance values given as $I_{xz}(i_y)$ where $i_y$ goes from 1 to N as shown in FIG. 4a. Similarly, for the z axial look direction, after computer processing the process gets N optical data values representing the voxel transverse (xy) irradiance values given as $I_{xy}(i_z)$ where $i_z$ goes from 1 to N as shown in FIG. 4b. Finally, for the x axial look direction, after computer processing one gets N optical data values representing the voxel transverse (yz) irradiance values given as $I_{yz}(i_x)$ where $i_x$ goes from 1 to N as shown in FIG. 4c.

Figure 5:
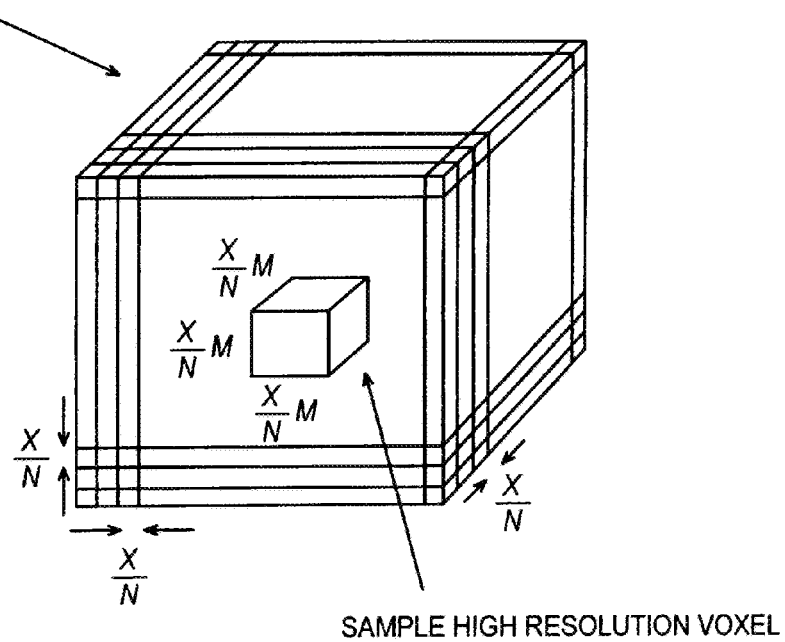
FIG. 5 shows is a typical high resolution voxel within the low resolution voxel of sides X.
Figure 6:
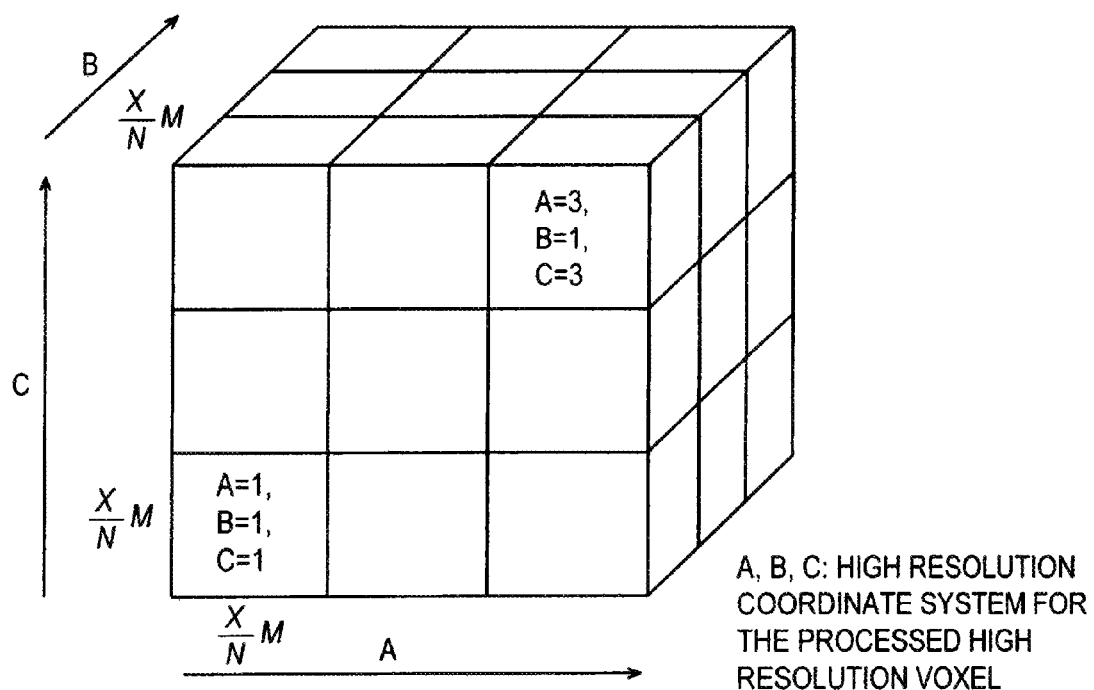
FIG. 6 shows the a, b, c coordinate system for the reconstructed super-resolution voxel.

The high resolution data is Nyquist sampling limited in bandwidth to N/X as the sampling frequency is twice this bandwidth or 2N/X. The next step is to interpolate this $I_{xz}(i_y)$, $I_{xy}(i_z)$, $I_{yz}(i_x)$ data sets to realize a 3-D super resolution voxel such as shown in FIG. 5 coordinate system with super resolution voxel sides of (X/N)×M where the numbers N and M dictate the improvement in resolution. FIG. 6 shows the a, b, c coordinate system for the reconstructed super-resolution voxel. If M=1, a maximum improvement in voxel resolution is achieved but at the cost of the largest reconstruction error. If M=N, there is no improvement in voxel resolution compared to the low resolution voxel of sides X and the reconstruction error is also zero. The value of M is set to a value between 1 and N so that the reconstruction error comes out to be at an acceptable value, e.g., less than approximately 10%, for example. Early simulations show that for N=200 and M=2, a 100 times better voxel resolution is achieved within a less than approximately 9% error from true high resolution voxel irradiance values. This case assumed a true one-to-one reconstruction of high resolution irradiance axial slices from the shifted low resolution voxel axial slice data via the computer algorithm data. In reality, the computer produced data will also have an error value.

Defined for any super resolution 3-D voxel is an irradiance weight $I_{xyz}(a,b,c)$ between 0 and 1, where a, b and c are the new super resolution coordinates each going from 1 to N/M. In this example, $$I_{xyz}(a, b, c) = \frac{1}{3}$$ Eq.1

$$\left( \sum_{i_x = M \cdot (a-1)+1}^{M \cdot (a-1)+M} I_{yz}(i_x) + \sum_{i_y = M \cdot (b-1)+1}^{M \cdot (b-1)+M} I_{xz}(i_y) + \sum_{i_z = M \cdot (c-1)+1}^{M \cdot (c-1)+M} I_{xy}(i_z) \right) \cdot \frac{M^2}{N^2}$$

$$a, b, c \in [1, 2, 3, \ldots, N/M]$$

The limits on the summations show that only the slices that contain the super-resolution voxel are used in its reconstruction. Here it is assumed that the super resolved irradiance values [i.e., $I_{xz}(i_y)$, $I_{xy}(i_z)$, $I_{yz}(i_x)$] are isotropic radiators for any given material subject to the proposed 3-D imaging, a reasonable assumption considering the small scale of the super-voxel with respect to the radiation wavelength. Note that each 2-D Irradiance slice value [i.e., $I_{xz}(i_y)$, $I_{xy}(i_z)$, $I_{yz}(i_x)$] contains N/M new super pixels in one transverse direction and N/M new super pixels in the other transverse direction. For example, each $I_{xz}(i_y)$ values is produced over a transverse average of N/M super resolution pixels in the x-direction and N/M super resolution pixels in the z direction, while along the y-direction, it is a single super pixel. Hence, each summed irradiance value per transverse data set must be divided by $(N/M)^2$ to get the normalized super resolution voxel average. Since there are 3 transverse irradiance data sets [i.e., $I_{xz}(i_y)$, $I_{xy}(i_z)$, $I_{yz}(i_x)$], one must also divide the entire sum by 3, hence the required 3-D processing Eqn. 1.

Recall that X was taken as the x, y, z direction spatial resolution limit of the electro-magnetic wave due to diffraction, etc. Now the reconstructed super resolution 3-D voxel basic building block is of size (X/N)M. Therefore, using the proposed processing, a voxel imaging resolution improvement of E is achieved where E is given by:

$$E = \frac{X}{(X/N) \cdot M} = \frac{N}{M}$$

If X=1 micron, and 2N=1000 with axial shifts needed per 1 nm, the final voxel super resolution after the proposed invention implementation is 2 nm per side, a 500 X improvement on the low resolution voxel of 1 micron sides. Note that the shifting operation of the low resolution axial scans is a form of signal sampling. The smaller the shift, the higher the sampling frequency and hence higher the bandwidth of the recovered high resolution axial scan. Although a shift with X/(2N) steps leads to signal reconstruction with X/N resolution (the Nyquist limit), a better signal reconstruction can be achieved by over-sampling the original signal at much higher rates than the Nyquist rate. Thus, higher quality signal recovery is achieved at the cost of lowering the bandwidth of the recovered signal, e.g., resolution could be for example, (4X)/N instead of X/N for the Nyquist rate.

Based on the type of signal data that depends on various factors such as optical confocal microscope parameters and test sample optical properties, optimal sampling/shift rates/sizes can be selected to produce the best high resolution axial slice data. Here, pure analog motion of the confocal light focal point via an analog lens focal length control process (e.g., via liquid crystal or MEMS device) is the key as extremely tiny optical axial steps can be possible. Also, because confocal or on-axis shifting and data collection is involved on a point-only basis in a given sample transverse plane, no traditional image noise is present as data is collected on a single transverse resolution basis in the signal processing method according to the present invention. The result is an improved high resolution 3-D signal reconstruction.

Figure 8:
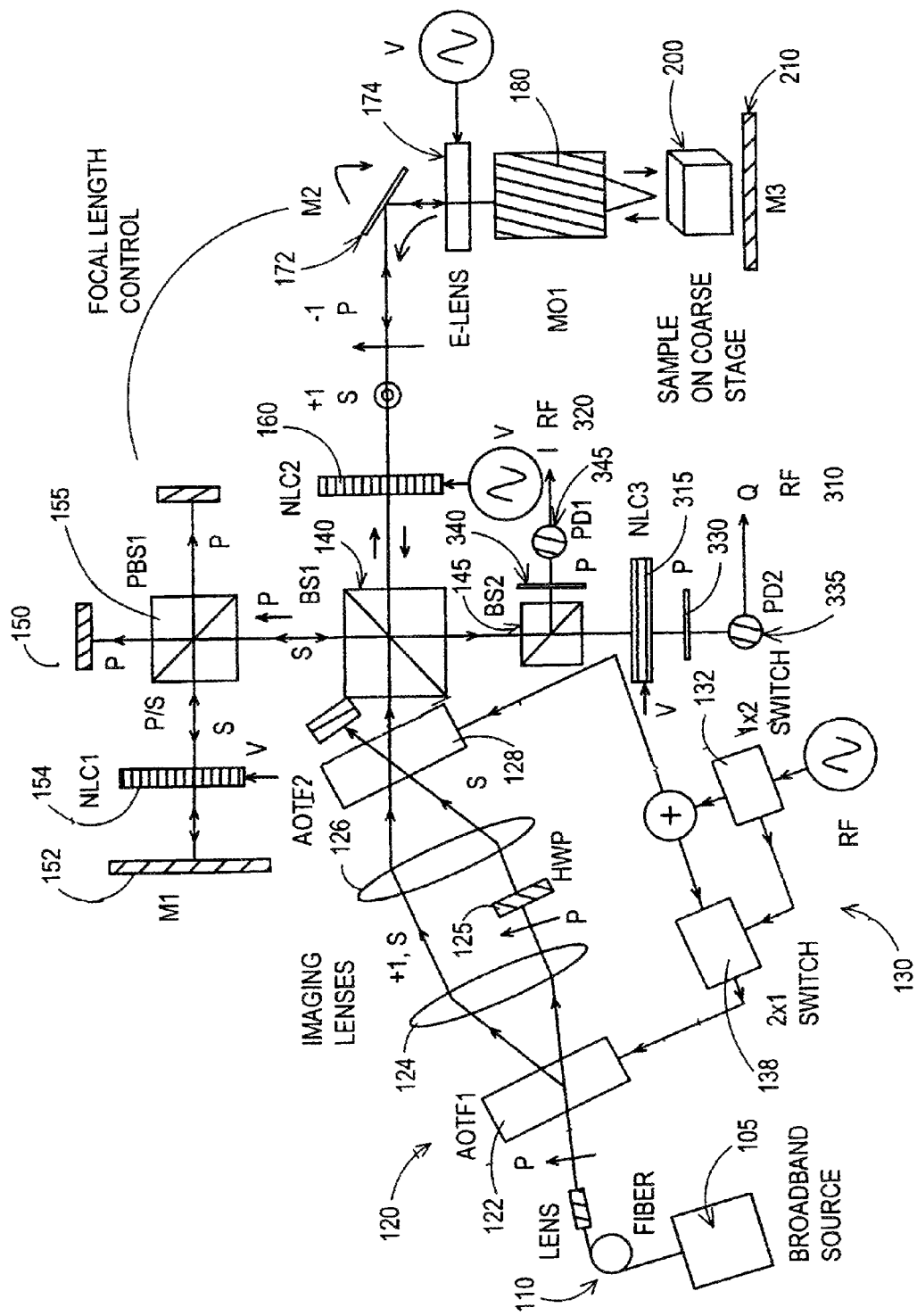
FIG. 8 is a schematic block diagram showing a system of the multi-function microscope that can implement profilometry, confocal microscopy, birefringence measurements, and spectral microscopy including Fourier domain-optical coherence tomography.

FIG. 8 is a schematic block diagram showing the design of the multi-function microscope that can implement profilometry, confocal microscopy, birefringence measurements, and spectral microscopy including Fourier domain optical coherence tomography, with measurements reaching the nano scale according to a preferred embodiment. The instrument consists of a first stage that produces wavelength selection, dual beam, polarization multiplexing, and RF Dopplers on the beam required for RF processing after photo-detection. This first stage is a key part of the instrument innovation as it accomplishes many functions in one small phase stable unit by virtue of its almost common-path design within the structure and in-line design at the exit beam position. The second stage of the instrument involves the E-lens based axial scanning optics that produces axial motion of the objective focus without moving the sample or objective. The third stage of the instrument is for dual RF signal generation, optical reference selection and photo-detection.

Referring to FIG. 8, the instrument works as follows. Light from a Broadband Source (BBS) 105 such as a photonic crystal fiber super continuum laser (such as the Model SC400 from Fianium, Inc.) that easily covers the visible spectrum and more (e.g., 400-2000 nm wavelength) is fed into the instrument using a Fiber Lens (FL) port 110 that produces a collimated horizontally (p-polarized) beam that is Bragg matched to a first visible band acousto-optic tunable filter device 122 labeled AOTF1. Another acousto-optic tunable filter device 128 labeled AOTF2 is placed in cascade with AOTF1 122 to form a two lens 1:1 imaging system 120 between the AOTF planes. A 90 degree p to vertical (s-polarization) rotator 125 is placed between the two lenses 124, 126 to rotate the polarization of the original input (DC) beam to s-polarization.

The two AOTF devices 122 and 128 are driven by the same RF signal to select the wavelength for the microscope. The RF is fed through fast control electrical 1×2 switch 132 and 2×1 switch 138 that determine if the single +1 beam enters the microscope or two beams of opposite diffraction orders (+1 and −1) enter the system when heterodyne interferometry is required.

The natural anisotropic Bragg diffraction process in the acousto-optic unable filter devices 122, 128 of the 1:1 imaging system 120 converts the incident linear polarized light into an orthogonal linear polarization diffracted first order beam. The +1 diffracted s-beam from AOTF1 122 operations passes through AOTF2 128 while a RF driven AOTF2 128 produces a −1 order p-polarized beam from the fiber lens 110 that becomes in-line with the AOTF1 122 produced +1 order s-polarized beam. Hence the dual AOTF module 120 has succeeded in producing 2 beams for eventual RF heterodyne detection that have orthogonal polarizations and hence can be used for birefringence measurements.

Unlike prior systems and devices, these 2 beams are exactly coincident in space and hence can simultaneously engage a test sample point under observation. Because the module 120 geometry is in-line, the system has high optical/RF phase stability, a key requirement for interferometry. The p+s beam pair from the imaging system 120 is split by Beam Splitter 140 (BS) BS1 with some p+s light going to an optical reference beam generation section 100. This optical reference section is engaged when the microscope operates with a single s-beam as input (i.e., only AOTF1 is active) to implement interferometric profilometry.

For non-interferometric confocal microscopy and profilometry, only AOTF1 122 is driven as the reference optical beam is not needed. Also, when both AOTFs 122, 128 are driven for the birefringent measurement mode of the microscope, this independent optical reference section 150 with a reference mirror M1 152 and electronically controlled phase NLC (nematic liquid crystal) cell 154 labeled NLC1 functioning as a Quarter-wave Plate is made active. In this case, the input reference s-beam is rejected as a p-beam via the straight port of the Polarization Beam Splitter 155 labeled as PBS1. When nematic liquid crystal cell NLC1 154 is electronically switched to its off-state, the s-beam input light is not rotated in polarization and hence returns as an s-beam to beam splitter 140 for eventual interference with the sample signal beam at the photo-detectors.

The p+s pair light passing straight through beam splitter 140 BS1 towards the test sample first passes through an optional bias retarder optical phase cell 160 called NLC2 that can impart a calibrated relative bias retardation between the p and s beams. Bias retardation is deployed when the test sample may have more than π birefringence. The mirror M2 assembly 170 (e.g., 2 MEMS mirrors 152 and 172) performs the x-y transverse scanning of the beam on the sample. Next the beam pair passes through an E-lens 174 whose focal length can be electronically controlled such as by using the broadband liquid E-lens as described in S. A. Reza and N. A. Riza, "A Liquid Lens-Based Broadband Variable Fiber Optical Attenuator," Optics Communications, January, 2009. After this focal length control, the beam pair enters a high NA microscope objective 180 labeled as MO1 to produce the diffraction limited orthogonally polarized beam pair.

The sample can be placed on an optional coarse resolution x-y-z translational stage 200 to extend the dynamic range of beam motion. An optional mirror 210 labeled as M3 can also be placed under the sample stage as needed. The returning sample reflected beam pair gets directed via beamsplitter 140 BS1 to be split by a second beamsplitter 145 BS2 to two RF detection ports 300. One port includes a NLC cell 315 called NLC3 that imparts a 90 degree or quadrature phase shift between the two reference beams (e.g., the p-polarization reference beam if s-beam is considered the signal beam) in the two separate detection arms. Two polarizers (P) 330 and 340 oriented at 45 degrees to s and p directions produces the optical interference operation of p and s beams via the two high speed photodetectors 335, 345 (PDs) that produce RFs at twice the acousto-optic tunable filter drive frequency. The photodetectors 335, 345 produce the test sample in-phase (I) and quadrature (Q) signals that can be processed by a phase-locked amplifier (not shown) to produce the magnitude and optical phase of the optical wavelength signal targeted on the test sample. The in-phase I and quadrature Q data at the RF ports 315 and 310, respectively, is acquired on a point-by-point basis and stored and processed by a computer.

For low resolution profilometry, the instrument operates in a non-interferometric mode where acousto-optic tunable filter 122 is driven and acousto-optic tunable filter 128 is off and nematic liquid crystal cell 154 is set to reject the independent reference optical beam. This mode of operation also implements 3-D confocal and spectral microscopy.

For high resolution profilometry, the instrument operates in an interferometric mode where acousto-optic tunable filter 122 is driven and acousto-optic tunable filter 128 is off but nematic liquid crystal lens 154 is set so that the independent reference optical beam from the mirror 152 returns to the photo detectors 335 and 345. This mode of operation also implements Fourier domain—optical coherence tomography.

To set the instrument as a birefringence meter, both acousto-optic tunable filter 122 and acousto-optic tunable filter 128 are driven and nematic liquid crystal cell 154 is set to reject the independent reference optical beam. Hence all modes of the proposed multi-function instrument are achieved. Note that the visible band acousto-optic tunable filters typically operate in microseconds and the nematic liquid crystal cells and scan mirrors operate in milliseconds. The liquid E-lens 174 such as from VariOptic, France operates in 100 ms. The instrument operations can be designed to first implement x-y scans before moving to the next axial scan position. Do note that faster scan optics can also be deployed using to faster imaging times.

Figure 9:
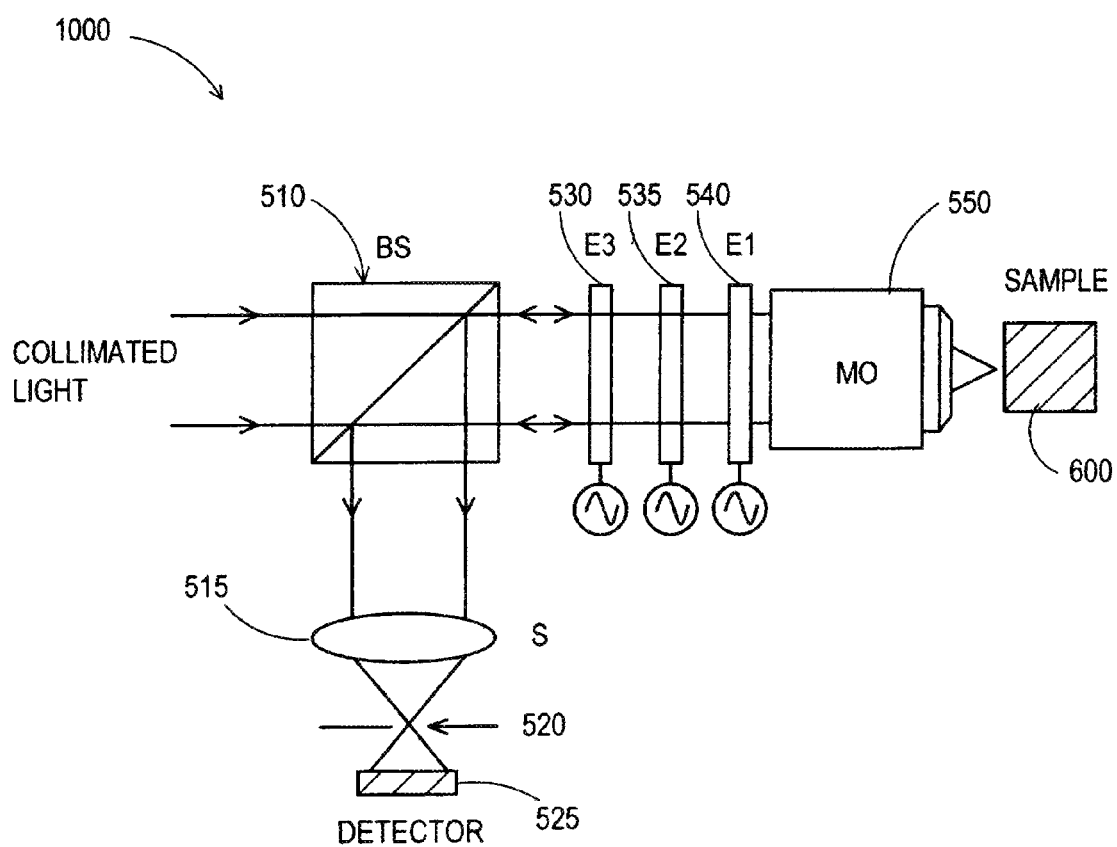
FIG. 9 is a schematic block diagram showing an example of a low aberrations Liquid lenses based confocal microscope design.

FIG. 9 shows the basic design of a multi-E Lens agile microscope design with reduced aberrations. The following designators are used in FIG. 9 to identify components in the following description.

| | |
|---|---|
| 510 | Beam-Splitter |
| 550 | Micro-Objective |
| 515 | Receiver Spherical Lens |
| 520 | Pinhole |
| 525 | Photo Detector |
| 530 | Aberration reduction E-lens |
| 535 | Aberration reduction E-lens |
| 540 | Axial Scanning Liquid Lens |

In particular, proposed is a liquid lenses based minimal-moving parts confocal microscope system 1000 design. Both the sample 600 and the microscope objective 550 remain fixed while axial scanning is achieved by simply varying the drive voltage to Axial Scanning Liquid Lens 540. In addition, to compensate for aberrations, in particular spherical aberration introduced due to the presence and operation of Axial Scanning Liquid Lens 540 within a high NA objective 550, two (or more) additional E-lenses, aberration reduction E-lens 530 and aberration reduction E-lens 535, with independent drive signals are used. Unlike nematic liquid crystal lenses, here the E-lens used is a liquid lens which has the additional advantage of being polarization-insensitive and broadband as compared to a typical nematic liquid crystal lens. More importantly, the liquid E-lens can form both positive and negative focus lenses via voltage control allowing the introduction of the required positive and/or negative focus wavefronts that can be used to reduce the spherical aberration in the scanned sample. Note that the use of aberration reduction E-lens 530 and aberration reduction E-lens 535 can also compensate for spherical aberrations that occur in the specimen when there is a refractive index mismatch between the specimen material and the index matching immersion fluid (and slide).

Earlier, deformable mirror spatial light modulators with multiple electrical drive signals (for the many, e.g., 37 actuators in the mirror membrane) have been used to reduce aberrations in confocal microscopes. In the system shown in the FIG. 9 design, only two electrical drive voltages are possibly needed to perform a similar function, hence reducing the complexity of the microscope.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method for three-dimensional optical imaging comprising the steps of:
   producing two orthogonally polarized optical scanning beams using an acousto-optic tunable filter arrangement;
   for each one of three different independent and orthogonal directions,
      axial scanning a three-dimensional object under evaluation with the two orthogonally polarized optical scanning beams on a point-by-point basis;
      detecting reflected optical energy from the three dimensional object under evaluation to collect plural one-dimensional axial scan optical data sets of the three-dimensional object;
      axial shifting of either a focus of the scanning optical beam or the object under evaluation in an axial direction only;
      repeating the scanning and axial shifting until the three-dimensional object under evaluation has been scanned on the point-by-point basis for each of the three different independent and orthogonal look directions to produce three sets of one-dimensional cross-sectional axial scan image data sets; and
   processing each set of one-dimensional axial scan data sets from each of the three orthogonal look directions by a computer executing a computer algorithm to produce three volumetric data sets; and
   combining the three volumetric data sets to a three-dimensional reconstructed image.

2. The method of claim 1 wherein the scanning step comprises the steps of:
   aligning an optical scanning source in one of the three different independent and orthogonal directions; and
   scanning the three dimensional object independently in each of a x-direction, y-direction and z-direction direction.

3. The method of claim 2 wherein the axial scanning step comprises the steps of:
   illuminating the three-dimensional object along an x-direction, y-direction and z-direction;
   obtaining plural x-direction axial scan data subsets along the x-axial direction, each data subset corresponding to a x-direction axial shift;
   obtaining plural y-direction axial scan data sets along the y-axial direction, each axial scan data set corresponding to a y-direction axial shift; and
   obtaining plural z-direction axial scan data sets along the z-axial direction, each data set corresponding to a z-direction axial shift.

4. The method of claim 3 wherein axial scanning comprises the step of:
   using one of a broadband optical source and a tunable laser with a dispersive lens to accomplish the axial scanning.

5. The method of claim 1 wherein the organizing and processing step comprises the step of:
   using a computer algorithm selected from a group consisting of Iterative Back Projection, Iterative Blind Deconvolution, and Maximum Likely-Hood Estimation.

6. The method of claim 5 wherein the processing step further comprises the steps of:
   processing the plural one-dimensional axial scan data sets for each of the three different independent and orthogonal axial directions to generate corresponding high resolution axial slice data sets along each of the three independent and orthogonal axial look directions using the Point Spread Function of the imager; and
   interpolating the three sets of axial slice data for each of the three axial look directions to reconstruct a 3-dimensional image of the object under evaluation.

7. The method of claim 1 further comprising the step of:
   using the method for one of spectral imaging, birefringence-based imaging and simultaneous spectral and birefringence-based imaging.

8. The method of claim 1 wherein the repeating step comprises the step of:
   moving the three-dimensional object along three different independent and orthogonal directions.

9. The method of claim 8 wherein the axial shifting step comprises the step of:
   moving the object under evaluation using a high resolution mechanical device.

10. The method of claim 8 wherein the repeating step further comprises the steps of:
    physically rotating the three-dimensional object by 90 degrees to a second position orthogonal from the first position; and
    flipping the three-dimensional object by 90 degrees to a third position orthogonal to the first and second positions.

11. The method of claim 1 further comprising the step of:
    Fourier transforming the collected plural one-dimensional axial scan data sets electronically to implement Fourier domain optical coherence tomography.

12. The method of claim 1 wherein the step of axial shifting comprises the step of:
    moving a focus position of a confocal focal microscope by a variable focal length electronic or mechanical lens.

13. A multi-function optical instrument to implement profilometry, confocal microscopy, birefringence measurements, and spectral microscopy including Fourier domain optical coherence tomography comprising:
    a wavelength tunable optical source to produce an input optical beam;
    an electronically controlled imaging system having an acousto-optical tunable filter coupled with the tunable optical source to produce and transmit two orthogonally polarized optical scanning beams and receive corresponding reflected optical beams for each of three different and independent orthogonal look directions;
    an axial scanning system coupled with the imaging system for axial shifting in an axial direction only one of either a focus of the optical scanning beam and the object under evaluation on a point-by-point basis;
    a detection system to detect reflected optical beams and generate plural one-dimensional axial scan optical data sets for each of the three different orthogonal look directions; and
    a computer system including a processor and memory for storing and for processing the plural one-dimensional optical data sets to produce a volumetric data set for each one of the three different orthogonal look directions and combining the three volumetric data sets to reconstruct a high resolution image of the object under evaluation.

14. The multi-function instrument of claim 13 wherein the imaging system comprises:
    a fiber lens to linearly polarize the input bean and produce a collimated horizontally p-polarized beam that is fed into the instrument; and
    an acousto-optic tunable filter arrangement to receive the horizontally p-polarized beam and produce two orthogonally polarized beams having a relative RF Doppler shift.

15. The multi-function instrument of claim 14 wherein the acousto-optic tunable filter arrangement comprises:

a first visible band acousto-optic unable filter device to receive the p-polarized beam and split the p-polarized beam into two p-polarized beams;

a second acousto-optic tunable filter device cascaded with first visible band acousto-optic unable filter device to form a two lens 1:1 imaging system between the first and second visible band acousto-optic tunable filter device planes;

a RF source to produce an RF signal to drive the first and second acousto-optic tunable filter device driven, the RF source used to select a wavelength for the microscope; and a first and a second imaging lens between the first and second acousto-optic tunable filter device and a 90 degree rotator located between the first and second imaging lenses to rotate the polarization of one of the two collimated horizontally p-polarized beams to s-polarization.

16. The multi-function instrument of claim 13 wherein the RF source comprises:

an RF generator to generate an input RF signal; and a fast control electrical 1×2 switch and a fast control electrical 2×1 switch serially connected to select one of a single beam to drive the first and second acousto-optic tunable filter device or two beams of opposite diffraction orders enter the system to each drive one of the first and second acousto-optic tunable filter devices for heterodyne interferometry.

17. The multi-function instrument of claim 16 wherein the second stage comprises:

an optical reference beam generation system to receive a first portion of the p-polarized plus s-polarized beam pair light, the optical reference section engaged when the microscope operates with a single s-beam as input when only the first acousto-optic tunable filter device is active to implement interferometric profilometry and birefringent measurement mode of the instrument.

18. The multi-function instrument of claim 17, wherein the optical reference beam generation system comprises:

a polarization beamsplitter to receive the first portion of the p-polarized plus s-polarized beam pair light from the first beamsplitter;

a reference mirror optically aligned with the polarization beam splitter and an electronically controlled phase nematic liquid crystal cell functioning as a quarter-wave plate between the reference mirror and the polarized beam splitter, the input reference s-beam from the first beam splitter rejected as a p-beam via the straight port of the polarization beam splitter, when the nematic liquid crystal cell is electronically switched to its off-state, the s-beam input light is not rotated in polarization and hence returns as an s-beam to first beam splitter for interference with a sample signal beam at a photo-detectors.

19. The multi-function instrument of claim 18 wherein the axial scanning system further comprises:

a bias retarder optical phase cell optically aligned to receive and optionally impart a calibrated relative bias retardation between the p-polarized and s-polarized beams, wherein bias retardation is activated when the object under evaluation has a birefringence may have more than π birefringence;

a mirror assembly optically aligned with the first beam splitter to reflect the p-polarized and s-polarized beam pair to perform the x-y transverse scanning of the p-polarized and s-polarized beam pair on the object under evaluation; and an E-lens having an electronically controlled focal length to receive the p-polarized and s-polarized beam pair for axial scanning optics that produce axial motion of the objective focus without moving the sample or objective; and microscope objective optically aligned to receive the p-polarized and s-polarized beam pair and produce a diffraction limited orthogonally polarized beam pair for axially scanning the object under evaluation.

20. The multi-function instrument of claim 13 wherein the detection system comprises:

a second beam splitter coupled with the first beam splitter to receive the reflected beam pair from the second stage and split the reflected beam pair into a p-polarized return beam and a s-polarized return beam each directed toward one of two separate detection circuits;

a first detection circuit having a nematic liquid crystal cell to shift the phase of one of the p-polarized return beam and s-polarized return beam followed by a first polarizer and first serial photo detector to detect the polarized optical return signal and produce quadrature signals, and a second detection circuit having a polarizer to polarize the corresponding one of the p-polarized return beam and a s-polarized return beam and a second photo detector to detect the polarized optical return signal and produce a corresponding test sample in-phase signal, the quadrature and in-phase signals processed by a phase-locked amplifier to produce the magnitude and optical phase of the optical wavelength signal targeted on the test sample.

21. The multi-function instrument of claim 13 further comprising:

a coarse resolution x-y-z translational stage to extend the dynamic range of beam motion; and an optional mirror placed under the coarse resolution x-y-z translational stage to reflect a sample reflected beam pair.

22. A liquid lens confocal microscope system comprising:

a light source for generating an input collimated beam;

an axial scanning liquid lens driven by a variable voltage source to axially scan an object by varying the axial scanning liquid lens drive voltage;

a microscope objective optically between the axial scanning liquid lens and an object under evaluation;

two or more broadband liquid E lenses that are polarization insensitive optically aligned between the light source and the axial scanning liquid lens to compensate for aberrations, each of the two or more liquid lenses driven by an independent drive signal;

a beam splitter to direct the input collimated beam toward the axial scanning liquid lens and reflecting a return optical beam from the axial scanning liquid lens to a receiver spherical lens and serial photo detector to produce an output signal in response to detecting a return optical signal from the beam splitter; and a voltage source to supply at least two different variable electrical drive voltages for the axial scanning liquid lens and the two or more broadband liquid E lenses to reduce aberrations in the liquid lens confocal microscope system.

* * * * *